Sept. 24, 1963     W. R. BLYTHE ETAL     3,105,214

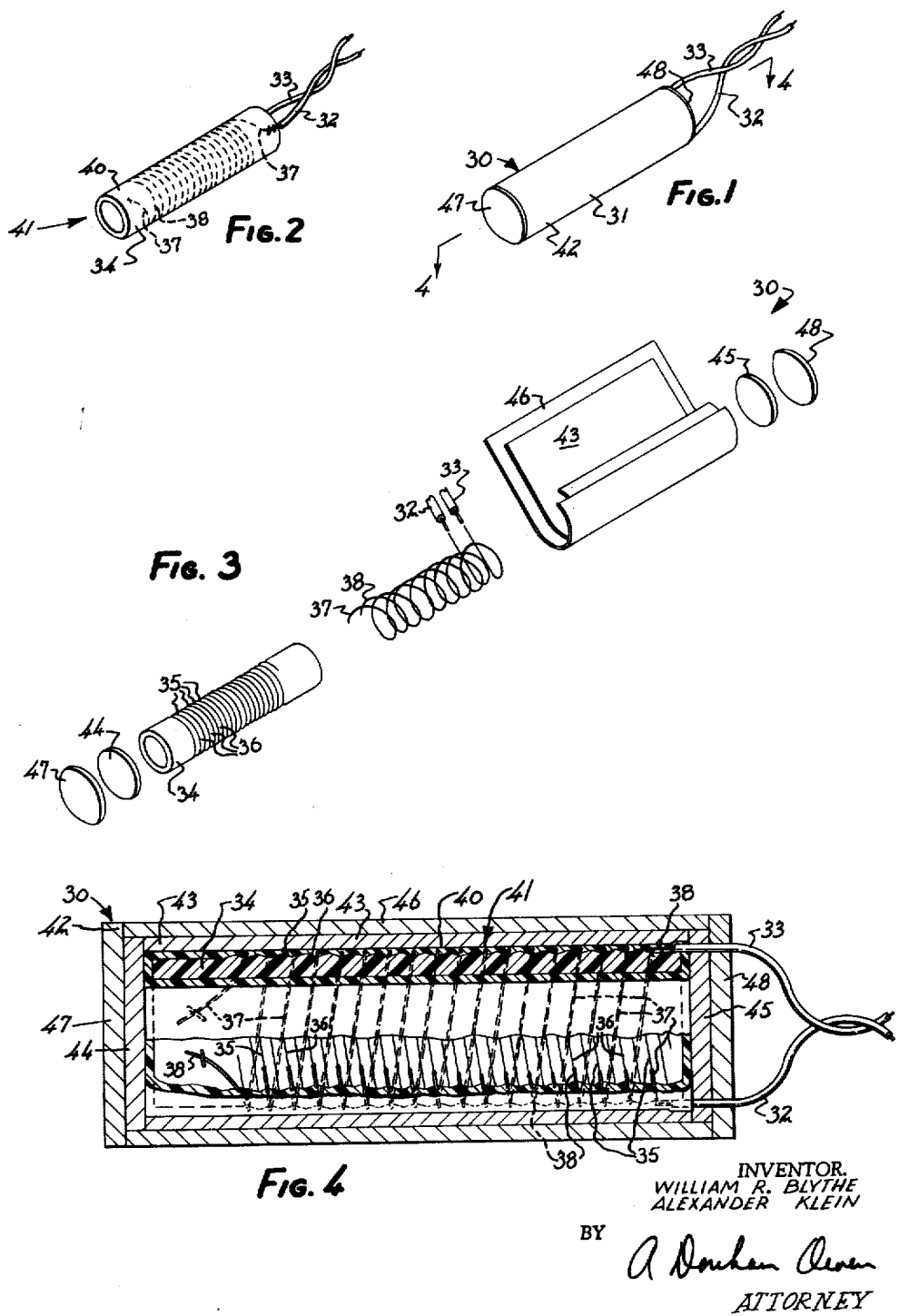

MOISTURE MEASURING APPARATUS

Filed Feb. 25, 1959     6 Sheets-Sheet 2

INVENTOR.
WILLIAM R. BLYTHE
ALEXANDER KLEIN

BY *[signature]*

ATTORNEY

Sept. 24, 1963   W. R. BLYTHE ETAL   3,105,214
MOISTURE MEASURING APPARATUS
Filed Feb. 25, 1959   6 Sheets-Sheet 3

INVENTOR.
WILLIAM R. BLYTHE
ALEXANDER KLEIN
BY
ATTORNEY

Sept. 24, 1963  W. R. BLYTHE ETAL  3,105,214
MOISTURE MEASURING APPARATUS
Filed Feb. 25, 1959  6 Sheets-Sheet 5

INVENTOR.
WILLIAM R. BLYTHE
ALEXANDER KLEIN
BY
ATTORNEY

United States Patent Office 3,105,214
Patented Sept. 24, 1963

3,105,214
MOISTURE MEASURING APPARATUS
William R. Blythe, Mountain View, and Alexander Klein, Danville, Calif., assignors to The Regents of The University of California, Berkeley, Calif.
Filed Feb. 25, 1959, Ser. No. 795,557
13 Claims. (Cl. 338—35)

This invention relates to the measurement of moisture and to moisture meters and probes therefor. More particularly, it relates to the measurement of moisture without relation to effects due to changes in mobile-ion concentration. Still more particularly, it relates to an electrical moisture meter and to a probe therefor unaffected by salinity in a porous medium whose moisture content is being measured. This application is a continuation-in-part of application Serial Number 704,944, filed December 24, 1957, now abandoned.

The electrical properties, including resistance and capacitance, of many materials vary according to the amount of water in the material, and this variation has served as the basis for many kinds of moisture meters. For example, moisture measurements have been based upon the change in electrical resistance or capacitance of a porous medium caused by changes in moisture content of the medium. The porous medium may be the very body whose moisture content is being measured (as where bare electrodes are embedded in soil or concrete) or may be separate blocks containing the electrodes and inserted in the body being measured, coming to an equilibrium moisture-content status with respect to its surroundings (where a Bouyoucos plaster-of-Paris block is embedded in soil). In either case, assuming that the dry material is nonconductive, the electrical resistance of the porous medium is a function of (1) the amount of water in the medium through which the electric current travels and (2) the number of mobile ions present in the water. Thus, the resistance will vary inversely with (1) water content and (2) salinity. In addition, the resistance of water increases with decrease in temperature. Also, when the water content is expressed as percent of the dry weight (as is customary in expressing the moisture content of soils), the same percent of water content means more water per unit volume with a denser material than with one less dense.

Effects of density and temperature changes on the calibration of an instrument can generally be measured and taken into account. Changes in the salinity of pore water, on the other hand, are not easily controlled or measured. In fact, none of the electrical moisture gauges heretofore known were capable of determining the moisture contents of concrete to the accuracy needed for adequate understanding of the effects of that moisture. Nor was any such gauge capable of determining moisture gradients in relatively thin sections. The failures of these prior-art gauges have been due largely to the effects of salinity and to the impossibility of eliminating these effects from the prior-art devices. The change in resistance, which supposedly was a measure of the change in moisture content, was affected both by the nature of the ions and by their concentration, introducing serious inaccuracies into the measurement of moisture in soils, mortar, and concrete, for example, as well as elsewhere. Wherever soluble salts are present, they affect the electrical measurements considerably. Moreover, the salt content may change with time (due to leaching, fertilizing, and other factors) so that even if it were known at any one time, accurate compensation could not be made for the subsequent measurements.

For example, when copper-plated carbon electrodes are embedded directly in soil and an alternating current is applied (as was done by the United States Department of Agriculture as early as 1897), variations in moisture content to produce changes in resistance that can be measured on a Wheatstone bridge. However, the resistance varies also according to the salt content of the pore water. Also, the physical contact of the electrodes with the soil varies as the soil dries and shrinks, and this may also cause considerable undesirable effects.

An attempt was made to solve the contact problem by embedding the electrodes in a controlled environment rather than directly in the body being measured. For example, electrodes have been cast in a small block of plaster of Paris; the porous block absorbs moisture and comes to an equilibrium with its surroundings. Similarly, nylon, mortar, glass fibers, and other materials have been used for this purpose. But none of them both register the effects of moisture and remove the effects of salinity on the pore water. In all instances, what they may indicate at high moisture content may simply be a high concentration of ions in a relatively small amount of moisture.

To give an idea of the extent of the inaccuracies to which prior-art moisture meters were subject, one investigator found that the electrical resistance of concrete varied not only with moisture content, but also with temperature, mix proportions, and composition differences in Portland cements and concretes. (R. W. Spencer, "Measurement of Moisture Content in Concrete," Journal of the American Concrete Institute, vol. 34, pp. 45–61, 1937.) He found that changes in the concentrations of soluble salts sometimes accounted for as much as a 40 percent change in resistance values. He found that the loss of other soluble materials, due to leaching by water moving through the mass, also had considerable effect upon resistance values. Variables dependent upon the mix and upon the curing conditions were evaluated by Spencer by casting and sealing control electrodes in glass jars and placing them within the structure near the field electrodes. Resistance readings of different sets of electrodes varied as much as 50 percent due to chance location of coarse pebbles close to or between the electrodes. Other limitations, listed by Spencer, included (1) failure of the resistance measurements to give a reliable indication of increases in moisture content after moist curing, over that originally present due to the mixing water, and (2) increased resistance readings due to poor bonding of the electrodes caused by shrinkage in the concrete.

Strain measurements of mortar specimens have been related to the moisture content of the specimens and with fair accuracy. However, several days are sometimes required before equilibrium is reached, and the method is not suitable for all porous media. Further, strain gauges are useless in structures under load or otherwise stressed.

Some other methods that have been somewhat successful when used in large masses of concrete employ equipment that is inherently so large that they are not adaptable to the investigation of moisture distribution in thin sections.

One object of the present invention is to provide a moisture meter with a probe which at a given temperature is affected only by moisture and not by the ionic activity within the medium whose moisture content is to be measured.

Another object of the invention is to provide a moisture-measuring device capable of relatively rapid response to moisture changes while still barring the ionic effects of salinity in the material whose moisture conditions are studied.

Another object of the invention is to provide a relatively inexpensive, simple moisture-measuring probe which may be left permanently in place in concrete structures or in soil or in other installations to indicate the moisture therein whenever measurement is desired.

Another object is to provide a moisture meter probe small enough to measure moisture gradients in relatively thin sections.

Another object of the invention is to provide a device which can be calibrated at various mosture contents in terms of other properties of the body being measured, such as soil density or concrete density, and can be used to indicate changes in these properties.

In general, a typical article embodying the invention may be described as a probe comprising a pair of conductors, in themselves not moisture sensitive but with moisture sensitive material between them, encased in a permselective ionic barrier which passes moisture adequately free of electrolytes. The barrier may be one or more resinous, ion-selective, semipermeable membranes and may also comprise the moisture-sensitive material. The invention, however, includes refinements of this general concept and of the method involving it. It also incorporates a wide range of structures and materials used in various manners.

Other objects and advantages of the invention will appear from the following description of some preferred embodiments thereof.

In the drawings:

FIG. 1 is a perspective view of a moisture meter probe embodying the principles of the present invention.

FIG. 2 is a view similar to FIG. 1 showing the probe with the ionic barrier removed.

FIG. 3 is an exploded view of the probe of FIG. 1.

FIG. 4 is an enlarged view in section taken along the line 4—4 in FIG. 1.

Figure 9:
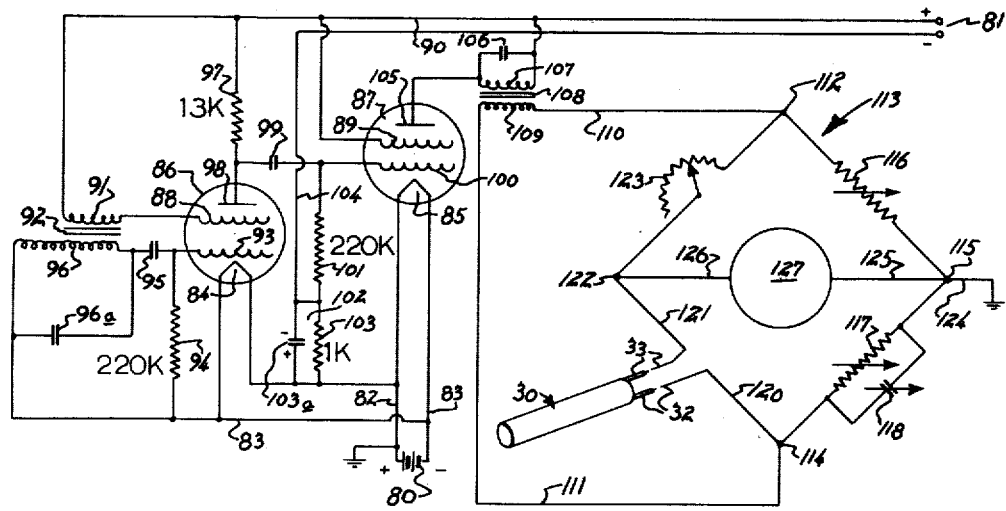
FIG. 9 is a circuit diagram showing the moisture meter probe of FIG. 1 connected to a measuring bridge (Bouyoucos bridge) utilizing an oscillating current.

FIG. 1 shows one form of moisture meter probe 30 embodying the present invention. This probe 30 has a small cylindrical body 31. Typical sizes vary from less than one to more than ten inches long and from about one-quarter inch to one inch in diameter, though the body 31 may readily be made larger or smaller, if desired. From one end of the body 31 two leads 32 and 33 extend, and they may be connected to any suitable electrical metering device, of which the bridge shown in FIG. 9 is only an example. The resistance across the leads 32 and 33 may be measured and calibrated in terms of moisture conditions in any medium wherein the body 11 is inserted. Electrical impedance across the leads 32 and 33, including not only resistance but capacitance and both together, may similarly be measured and calibrated in terms of moisture conditions. Because of the wide variety of sizes feasible, the probe 30 may be used in very small samples to study moisture gradients therein.

FIGS. 2–4 illustrate the construction details of the probe 30. This particular unit employs a core 34 of suitable dielectric material. Preferably, the core 34 should be of extremely low electrical conductivity. Glass appears to introduce a hysteresis effect due to adsorption of water when its surface is etched to provide grooves, unless its surface is covered with a suitable waterproof material such as polystyrene. Preferably the core 34 is made directly from polystyrene tubing or other similar material.

The core 34 is provided with shallow bifilar grooves 35 and 36, as by machining in a metal lathe. In the grooves 35 and 36 may be wound respective wires 37 and 38. The grooves 35 and 36 are shallow, because the wires 37 and 38 preferably lie on or very close to the surface of the core 34, rather than being set down into it. The ends of the wires 37 and 38 may be sealed to the core 34 by a soldering iron or by cement. Wires which are corrodible by moisture are obviously undesirable, because errors may be introduced into the measurements by the formation of a film of oxide or salt. So noble metals and non-film-forming alloys are preferable materials for the wires 37 and 38. Gold, platinum, and palladium wires are suitable, as are wires plated with such metals. For example, jewelers' palladium wire, such as Baker alloy No. 839, which is 96% pure palladium and No. 38 AWG (American Wire Gauge), may be used.

When the wires 37 and 38 have been wound on the core 34, the wires and core may be coated with a moisture-sensitive film 40, which is often hygroscopic. Any film suitable for use in hygrometers may be used, i.e., any material that absorbs water vapor and comes to an equilibrium moisture state with respect to its environment or surrounding atmosphere in a conveniently short time. For example, polyvinyl alcohols, some of which are sold under the trademark Elvanol by E. I. du Pont de Nemours, are preferred for many uses. Some polyvinyl acetates and chlorides are also good. Plaster-of-Paris may be used, but is bulkier, more frangible, and more likely to deteriorate with time. Nylon and many other materials are usable, although for any particular set of conditions some coatings may be preferable to others. As will be seen later, materials incorporating ion-exchange resins as a component may be employed as the moisture-sensitive film 40. In fact, the ionic barrier itself may serve as the moisture-sensitive film 40.

The film 40 may be applied by dipping the wire-wound core into a solution or suspension of the film material or into molten film material, or the film 40 may be sprayed on or brushed on or otherwise applied. For example, polyvinyl acetate may be dissolved in ethanol or in a mixture of ethanol and distilled water; partially hydrolized polyvinyl alcohol may be dissolved in a mixture of distilled water and ethanol. As another example, ion-exchange resins may be suspended in polyvinyl acetate, polyvinyl chloride, or polyethylene. The core may be dipped in such solutions, drained, and dried. More dilute solutions may be sprayed. The more dilute the solution, the thinner a uniform coating that may be obtained. The thickness of the film 40 and its composition may be varied to give desired results, as will be explained later.

The article 41 resulting from winding the wires 37 and 38 on the core 34 and then applying the coating 40 is shown in FIG. 2 and is a hygrometer or hygrostat. It may be immersed, encased, or embedded in various things for measuring their moisture content, but it is subject to the effects of salinity as well as of moisture, except where ion-exchange resins are a substantial component of the coating 40. In the present invention the effects of salinity are avoided by complete encasement of the hygrometer 41 in a permselective case or coating 42 that forms an ionic barrier.

The case 42 may be one or more resinous, ion-selective, semipermeable membranes. There are many permselective materials. For example, collodion passes water vapor but not liquid water. Among the most useful for this invention are ion-exchange resins. Some of these are incorporated in membranes produced in sheet form; some may be incorporated in a form suitable for dipping. The membranes readily allow passage of ions of one charge while offering great resistance to ions of the opposite charge. Accordingly they are known as "cation permeable membranes" and "anion permeable membranes." Those that are cation-permeable are anion-impermeable, and those that are anion-permeable are cation-impermeable.

One typical cation-permeable membrane may be regarded as a three-dimensional network of an insoluble organic polymer. Bound into the chains which make up this network are reactive chemical groups such as sulfonic, carboxylic, or phenolic. The interstices between the chains are filled with water, and the attached acidic groups, being more or less free to dissociate, are capable of exchanging any cations which may be in the water in the interstices. Random passages exist through the membranes which, in the ideal case, are of such width that ions can pass through only by displacing some of the ions on the acidic groups lining the passages. Such displacement can occur only by an ion exchange mechanism. Since acidic groups lining the passages of a cation-permeable membrane can exchange only cations, the membrane is readily permeable to cations but offers great resistance to the passage of anions.

On the other hand, basic groups line the passages in an anion-permeable membrane, and these exchange only anions. The anion permeable membrane is therefore readily permeable to anions but offers resistance to the passage of cations.

There is nothing critical about which permselective membranes are used, though some are preferable under certain circumstances. A discussion of various materials may be found in Bodamer Patents Nos. 2,681,319 and 2,681,320. But other perm-selective membranes may be used. The use of both anion-permeable and cation permeable membranes gives double protection but is not always necessary. In many instances, an anion-permeable membrane alone is sufficient, and in many instances a cation-permeable membrane alone is sufficient.

FIG. 3 shows a flat, flexible anion-permeable sheet 43 that is wound around the hygrometer probe 41 next to the coating 40. Discs 44 and 45 of the same material are used at the ends of the core 14, and are sealed to the cylindrical sheet 43 by heat or cement, to eliminate passage of moisture to the hygrometer 41 except through the anion-permeable material 43, 44, and 45. If desired, a cation-permeable sheet 46 and cation-permeable discs 47 and 48 may be placed around the sheets 43, 44, and 45. The discs 47 and 48 are sealed to the sheet 46. If desired, the cation-permeable membranes may be placed inside and the anion-permeable membranes outside. For some cases, only one membrane of either type is enough. In place of this type of assembly, the hygrometer probe 41 may be dipped in a liquid form or solution or suspension of permselective membrane ingredients. In either event the wires 37 and 38 are connected respectively to the insulated leads 32 and 33, and the insulation is sealed to the permselective membranes.

The complete probe 30, then, has a permselective casing 42 that permits the passage of water vapor while barring the passage of ions. Water vapor passes to the moisture-sensitive film or coating 40 until an equilibrium condition is reached with respect to the environment. If the environment outside the permselective coating 42 becomes dried, the coating 40 will give up water, and that water will pass back through the permselective membrane 42. In other words, water may pass both ways; so an equilibrium condition is maintained with some time lag. The extent of the time lag depends on the material used in the coating 20 and on the permeability by water vapor of the casing 42. These both may be chosen to give relatively quick effects. The device may be made to respond within a few minutes, or several hours may be necessary with some constructions.

The water vapor that is absorbed by the coating 40 greatly alters the electrical resistance between the bifilar wires 37 and 38. The coating 40, when dry, is substantially non-conductive, but as water vapor is absorbed, it becomes more and more conductive. As a result, a measurement of the resistance or impedance by a suitable type of ohmmeter or other device will give a curve which can be calibrated, as will be explained later, to correlate resistance values or impedance values with relative humidity conditions or with the moisture pervading the environment in which the body 31 is placed.

Figure 5:
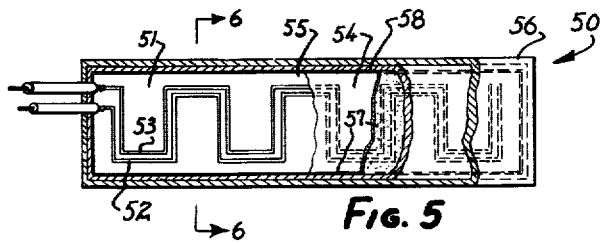
FIG. 5 is a plan view, partly in section, of a modified form of the invention, employing a printed circuit on a flat base, shown with various layers successively broken away.
Figure 6:
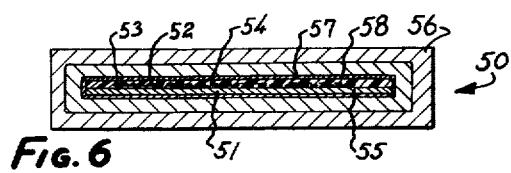
FIG. 6 is an enlarged view in section of the complete probe of FIG. 5, taken along the line 6—6 of FIG. 5.

A modified form of the invention is shown in FIGS. 5 and 6. Here the moisture sensing unit or probe 50 is flat instead of cylindrical. The base 51, which replaces the core 34, may be simply paper, preferably coated with plastic, or may be a plastic film, such as polystyrene. In this particular instance the unit is shown with a printed circuit comprising two printed filaments 52 and 53 corresponding to the wires 37 and 38 and spaced apart uniformly over their length. They may be on the same side of the base 51, as shown, or on opposite sides. A hygroscopic or moisture-sensitive medium 54 may be printed on the film base 51 or otherwise applied as by dipping, spraying, brushing, or other means, to fill the spaces between the two conducting elements 52 and 53 with the necessary moisture-sensitive coating. The result of these actions is again to provide a hygrometer or probe 55, which is flat, but in other ways generally resembles the probe 41 and operates in substantially the same manner. The coating may be polyvinyl alcohol as before, or may be any other suitable medium.

Then, as previously, the hygrometer 55 is coated or encased in a permselective casing 56. This casing may be applied by folding and sealing a sheet or sheets of permselective material over the hygrometer 55, or the hygrometer 55 may be dipped or sprayed to cover it with a sufficient thickness of permselective material. In case the coating 54 requires air around it, a thin polar sheet such as lens paper 57 may be inserted to provide the presence of an effective vapor chamber 58. The operation of the unit 50 is substantially identical to that discussed in connection with the meter 30 shown in FIGS. 1 through 4.

FIGS. 5 and 6 also illustrate that instead of having the sensing element cylindrical, it may be plate-like or wafer-like, and that the conducting elements may be wire, plates, or printed elements with the space between them again being a suitable moisture-sensitive material. This helps to illustrate the breadth of the present invention.

While cylindrical forms are not necessary, it may be mentioned that it is one way of providing uniform results where wires are used and insuring that the wire will be embedded evenly and completely in the coating. Printed circuits may also be made uniform, but when hygrometers are formed by winding on square or rectangular forms, there is usually some overlap at the edges where the turns cannot be made to precisely fit the form, and therefore the coating is not even. These units may be used, but they are not considered to be as reliable as the others that have been described where relatively short conductors are employed; in large meters the effect of overlap may be inconsequential. Flat, leaf-like wire-wound forms are also highly practical.

An important feature of the invention is its ability to employ the permselective membrane itself in several capacities—as the core or as the moisture-sensitive medium as well as the ionic barrier coating, or as all of them. Remembering that this membrane may be either an already-made sheet or may be made in situ by dipping, spraying, or brushing, and that one or more ion-exchange resins, for example, may be used either alone or in a suitable suspending medium, the invention has great adaptability. Thus, the core 34 or 51 may be an ion-selective membrane, and the coating 40 or 52 may be formed by dipping or spraying an ion-exchange resin on the conductors and core. The conductors may be wound on or embossed directly on a membrane-type core. When the coating 40 or 52 is itself an ion-exchange resin, no additional permselective membrane is needed; the resin already present functions in a dual capacity. Just as in the probes as heretofore described, such probes are embeddable in bodies having electrolytic components and the electrolytes will not affect operation.

Figure 8:
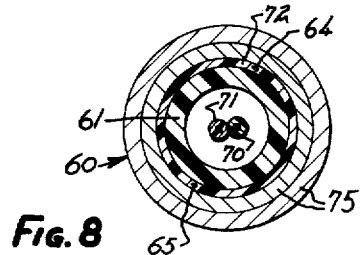
FIG. 8 is a view in section taken along the line 8—8 in FIG. 7.
Figure 7:
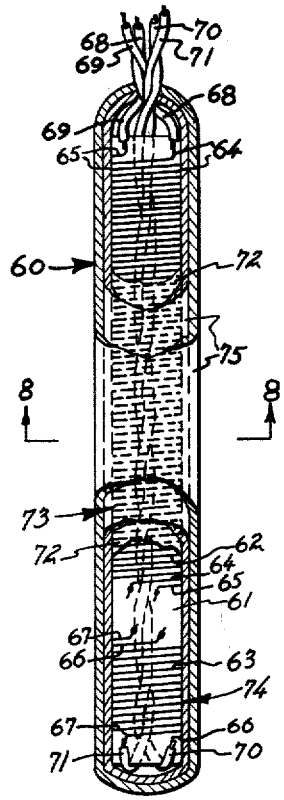
FIG. 7 is a view in elevation and partly in section of another modified form of moisture meter probe embodying the invention, with portions of its outer ionic-barrier covering broken away to show the interior.

FIGS. 7 and 8 show a unit 60 generally resembling the unit 30 but with some important differences. Here a core 61 (which may be a permselective membrane) is provided with bifilar grooves located in two series or groups 62 and 63. One group 62 is much longer than the other group 63 and for purposes of the example, the groove spacings are identical, although they may be different in a particular unit if desired. In the group 62 two wires 64 and 65 are wound as the wires 37 and 38 were wound, and two other wires 66 and 67 are similarly wound in the group 63. The wires 64, 65, 66, and 67 are respectively connected to leads 68, 69, 70, and 71, preferably of a plastic-insulated type. Thus, the group 62 comprises a hygrometer like the unit 30 but somewhat longer and therefore with a lower over-all resistance. The group 63 is also like the unit 30 but is shorter and, of course, is much shorter than the unit 62, so that its resistance is substantially higher than theirs. The groups 62 and 63 are then coated with a moisture-sensitive medium 72, which may be polyvinyl alcohol, an ion-exchange resin, or other suitable material, to provide two hygrometers 73 and 74. The hygrometers 73 and 74 are then coated with permselective membrane 75, as before (unless the membrane 75 and medium 72 are unitary), to provide an ion barrier that permits the passage of moisture in the form of water vapor while denying passage to ions of electrolytes.

The unit 60 has a variety of uses. The two groups 62 and 63 may be used separately, in parallel or in series, so that it is possible, by connecting the leads 68, 69, 70, and 71 to a meter in various ways, to obtain from this one unit 60 four different readings. A simple four-position electric switch may be provided in the measuring bridge to simplify operations, so that any one position may be obtained simply by moving the switch. This means that calibrations under various circumstances can be obtained to give curves which will vary somewhat from each other though they will have general similarities. Such a unit can make very accurate moisture readings.

As stated earlier, practically any type of electrical ohmmeter may be used to obtain the resistance between the bifilar windings or sensing conductors and the moisture-sensitive coating that separates them. Purely for the sake of example of illustrating a suitable bridge, the electrical circuit of FIG. 9 is shown. It is not by any means necessary to use this particular circuit although it is an excellent one and will give very good results.

The power for the circuit of FIG. 9 is preferably obtained from an oscillator circuit. Filament voltage may be obtained from a 1½ volt A battery 80 while the plate voltage may be obtained from a 45-volt B battery 81. The battery 80 is connected by leads 82 and 83 to filaments 84 and 85 of a pair of tetrode tubes 86 and 87. In both tubes 86 and 87, the respective screen grids 88 and 89 are connected by lead 90 to the positive side of the battery 81, the lead 90 to the screen grid 88 leading through the primary winding 91 of a transformer 92.

In the tube 86 the grid 93 is biased relative to the filament 84 by a resistance 94 and is connected through a condenser 95 to a tuned parallel inductance 96 and condenser 96a, the other side of the network being connected to the lead 83. The inductance 96 is also the secondary winding of the transformer 92.

The lead 90 is connected across a load resistance 97 to the plate 98 of the tube 86. The plate 98 is connected through a condenser 99 to the first grid 100 of the second tube 87. This grid 100 is biased to its filament 85 by a resistor 101 in series with a filter 102 consisting of resistor 103 and capacitator 103a to the positive line 82, while a lead 104 beween the resistor 101 and filter 102 is connected to the negative side of the battery 81. The plate 105 of the tube 87 is connected to a tuned parallel capacitance 106 and inductance 107 network. The inductance 107 serves as one side of an output transformer 108 whose other coil 109 is connected across output leads 110 and 111. In practice, the oscillator illustrated had an output frequency of 360 c.p.s., and the values of some of the parts are shown on the drawings.

The lead 110 goes to one corner 112 of the bridge 113 while lead 111 goes to the opposite corner 114 of the bridge. The bridge corner 112 is connected to a third corner 115 by a variable resistor 116, while the corner 114 is also connected to the corner 115 by a variable resistor 117 together with a bypass variable trim condenser 118.

The leads 32 and 33 of the moisture unit or probe 30 (or 50 or 60) are connected to respective leads 120 and 121. The lead 120 is connected directly to the corner 114 while the lead 121 is connected to the fourth corner 122 of the bridge 113. The corners 112 and 122 are then connected to each other by a variable resistor or rheostat 123. The corner 115 is preferably at ground potential, as by a grounding lead 124 and is connected to the corner 122 by leads 125 and 126 that pass across a Ballentine voltmeter 127 or other similar device. This setup is known as a Bouyoucos bridge.

There are, of course, many ways in which the moisture meter of this invention may be calibrated. One of these is to use saturated salt solutions in sealed flasks, which tend to produce well-known values of relative humidity in the atmosphere in the flask, at standard temperatures. A unit 30 is inserted in a sealed flask containing these salts and the resistance measured across the meter. Table I shows some salts and the humidities they produce at 21° C. although these data are well known.

Table I

| Salt solutions: | Percent relative humidity @ 21° C. |
|---|---|
| Sodium nitrite, $NaNO_2$ | 66 |
| Ammonium sulfate, $(NH_4)_2SO_4$ | 81 |
| Potassium bisulfate, $KHSO_4$ | 86 |
| Zinc sulfate, $ZnSO_4 \cdot 7H_2O$ | 90 |
| Sodium acid phosphate, $Na_2HPO_4 \cdot 12H_2O$ | 95 |
| Lead nitrate $Pb(NO_3)_2$ | 98 |

Figure 10:
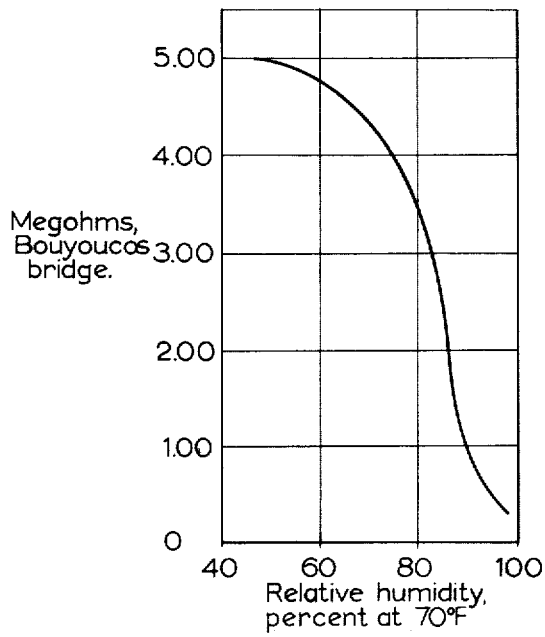
FIG. 10 is a graph showing a typical response obtained when using the bridge circuit of FIG. 9 in atmospheres of various known relative humidities, thereby indicating a calibrating curve for relative humidity.

In actual tests solutions of the above salts were placed in the bottom of 1000-ml. Erlenmeyer flasks and stored at 21° C. The flasks were sealed with hygrometers 41 suspended from the neck in the atmosphere but not in contact with the solutions for the calibration. A typical calibrating curve resulting from the plotting of the resistance in a hygrometer 41 against these known relative humidities is shown in FIG. 10. Such curves may then be used wherever relative humidity is to be tested.

Figure 11:
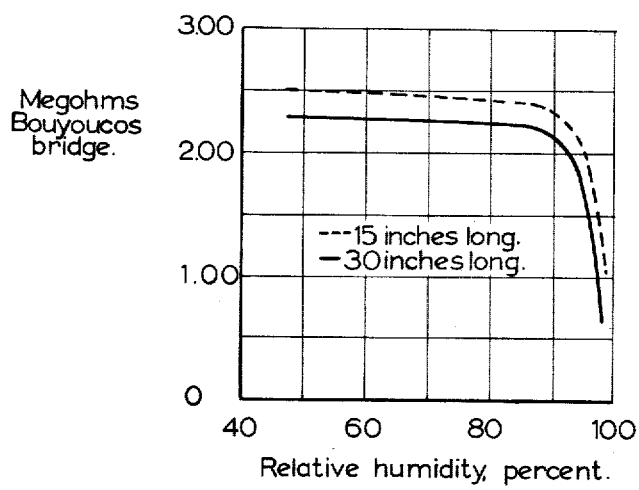
FIG. 11 is a graph showing the differences in response between two meters both having probes wound at twenty turns per inch, one fifteen inches long and one thirty inches long.

Numerous variations may be achieved by varying the construction of the apparatus. Thus, a different calibration would be obtained with a different type of coating solution; and a different result would be obtained if the wires are spaced different distances apart or wound into longer or shorter units. Wires have been wound at various spacings, such as five, ten, fourteen, and twenty turns per inch. As might be expected, units with fewer turns per inch were less responsive and somewhat less accurate. Excellent results were obtained with units wound at the narrower spacing. FIG. 11 shows the response of two test units both wound at twenty turns per inch tested at 70° F. over a range of humidities. However, in one unit the windings were fifteen inches long, and in the other unit they were thirty inches long. The effect of decreasing either the rate of wind or the total length of wire was to shift the curve upward on the resistance scale and to decrease the uniformity of the response.

Figure 12:
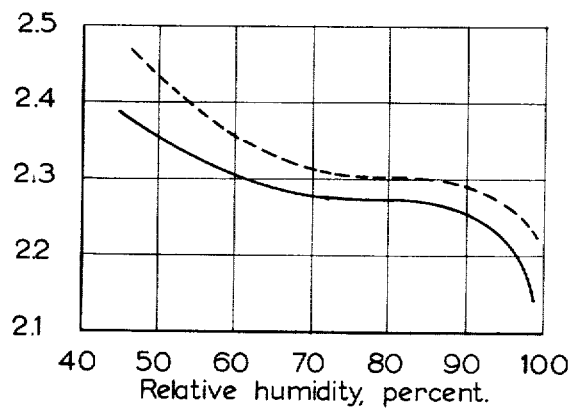
FIG. 12 is a graph of two curves showing the response of two units at 70° F. both with probes wound at twenty turns per inch and coated with a dilute vinyl acetate copolymer, plotting megohm measurement against relative humidity.
Figure 13:
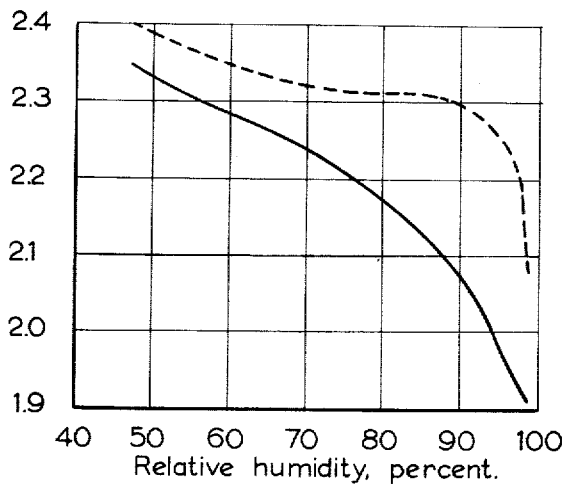
FIG. 13 is a graph similar to FIG. 12 differing only in that a more concentrated solution of the same polymer was used.

To indicate the differences caused by the type of coating materials, reference will be made to FIGS. 12, 13, 14, and 15. In FIGS. 12 and 13 the units were coated with a vinyl acetate copolymer as the hygroscopic medium. All these units were wound at twenty turns per inch and tested at various known relative humidities, to give the two curves shown in each graph. In FIG. 13 the solution comprised 25.0% of du Pont "Elvalan," a vinyl acetate polymer, dissolved in ethanol, whereas in FIG. 12, 3.5% of the same material was dissolved in a fifty-fifty mixture of ethanol and distilled water. The results of concentration are shown and it will be seen that the curves were different, due solely to the increased concentration of the coating material.

Figure 14:
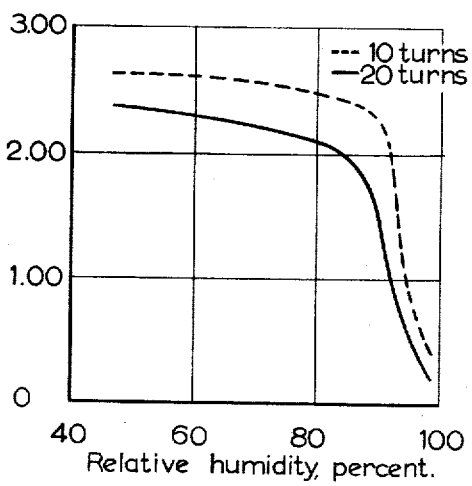
FIG. 14 is a graph like that of FIG. 12 for two instruments in which a dilute solution of polyvinyl alcohol was used as the hygroscopic coating medium. One instrument probe was wound at ten turns per inch, and the other one was wound at twenty turns per inch.
Figure 15:
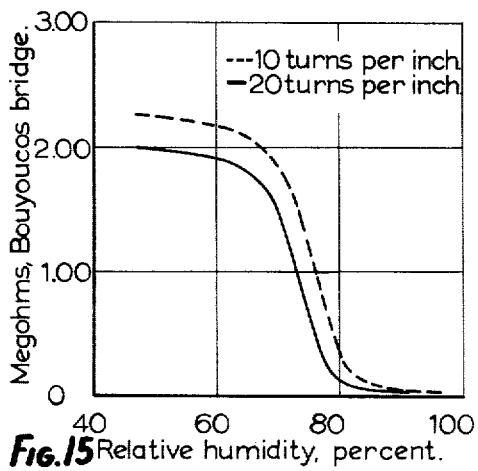
FIG. 15 is a view like FIG. 14 for similar instrument probes in which a more concentrated solution of polyvinyl alcohol was used.

FIGS. 14 and 15 illustrate the changes made with polyvinyl alcohol in similar situations. In each of these figures two curves are shown, one where the winding was ten turns per inch and another where the winding was twenty turns per inch. In FIG. 14 a 3.5% solution of du Pont "Elvanol 20–105," which is a partially hydrolized polyvinyl alcohol, was dissolved in a fifty-fifty mixture of ethanol and distilled water. In FIG. 15 the units were constructed the same except that 12.0% of Elvanol was dissolved in the ethanol-distilled-water mixture.

In all the cases shown in FIGS. 12 through 15, the moisture units were dip-coated at room temperatures. The units coated with dilute materials were immersed rapidly and were then withdrawn at the rate of approximately one inch in ten minutes, a clock mechanism being employed for precision in this part of the coating operation. With the concentrated solutions of FIGS. 13 and 15 the units were immersed slowly and were thereafter withdrawn by hand over a period of about twenty seconds. The application in all cases was at room temperature, except that the concentrated solution of Elvalan was applied at 45° C. to prevent precipitation.

Figure 16:
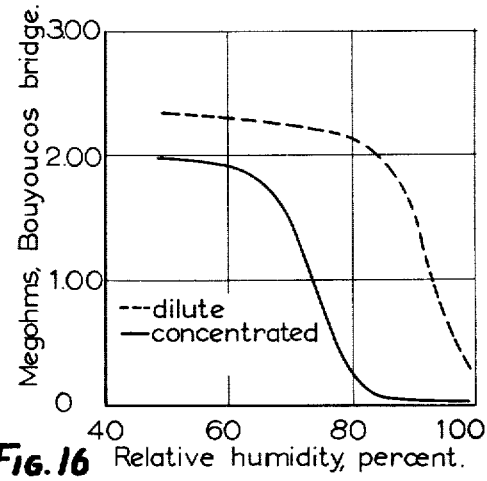
FIG. 16 is a graph plotting relative humidity against resistance in megohms for two instrument probes differing only in the concentration of the coating solution used, showing the effect of concentration of the coating solution on a single graph.

Some further indication of the effect of concentration and dilution of the Elvanol solution is shown in FIG. 16 where the two are compared on one graph, showing that the concentrated solution resulted in a thicker and more concentrated coating that reduced the resistance considerably, making it more sensitive to low relative humidities and less sensitive to high relative humidities. This points to the construction of moisture meters for different ranges of humidities or moisture contents.

Figure 17:
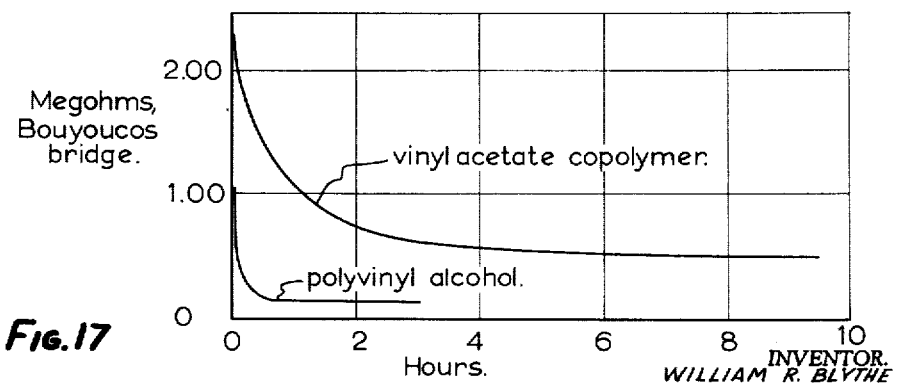
FIG. 17 is a graph showing the time required for two typical hygrometers without permselective membranes to achieve equilibrium. The two curves represent results from two different coating materials, time being plotted against resistance for measurement of humidities of known values.

It has been mentioned earlier that the polyvinyl alcohols were preferred to the polyvinyl acetates in general. One reason for this was the relatively quick response obtained by the alcohol solutions, and this is shown in FIG. 17 which graphically displays the time required for typical units to achieve equilibrium. The polyvinyl alcohol achieved equilibrium in about a half hour, while equilibrium was not achieved by the polyvinyl acetate for almost eight hours.

The effect of temperature may be noted. An increase in the temperature decreases the resistance reading. This is common to all resistance meters, because water decreases in resistance with increased temperatures. Calibration curves may be made at varying temperatures, as has been done, or the temperature gradient can be learned and applied, or measurements may be carried at standard temperatures. It is quite a simple matter to provide a thermocouple adjacent to the meter wherever it is installed to give the temperature there so that the readings can be properly evaluated.

Some examples will now be given of probes where the permselective membranes themselves are utilized as the moisture-sensitive medium of the hygrometer and where the protective membrane was made by dipping wire-wound frameworks in a powdered ion-exchange resin dispersed in a carrier. Vinyl plastics, polyethylene, and synthetic rubber-latices are suitable carriers. Flexible, leaf-like hygrometers may be made by winding parallel wires on a thin sheet, such as $1/16''$ polyethylene or anionic Amberplex, an ion-exchange resin, for example. These assemblies or similar ones may then be covered with a membrane of either anionic or cationic exchange resin, or a combination of both may be used. The membrane may be formed by dipping the assembly into a mixture of one or more ion-exchange resins and a carrier. For this purpose, Amberplex in powdered form may be used. For example, a cationic dip mixture may be made by a direct mixture of the Amberplex cationic powder in Hycar 1852, understood to be a polyanylic latex emulsion. Anionic mixtures may be made by rubbing or rolling a partially dry sheet of latex emulsion in powdered anionic resin, to prevent flocculation of the anionic material. A dual mixture may be prepared by taking a partially dry sheet of latex emulsion containing admixed powdered cationic resin and rubbing it with or rolling it in powdered anionic resin to produce a mixture.

A probe comprising only a cationic permselective membrane as both the ionic barrier and the moisture-sensitive film, tested as follows:

| Relative humidity— | Electrical resistance, ohms |
|---|---|
| 20% | 295,000 |
| 50% | 170,000 |
| 98% | 30,000 |

A second probe, comprising only an anionic permselective membrane as both moisture-sensitive film and the ionic barrier, tested as follows:

| Relative humidity— | Electrical resistance, ohms |
|---|---|
| 20% | 400,000 |
| 50% | 240,000 |

A third probe was made using about four feet each of wire electrode wound on a $1\frac{1}{2}'' \times 4''$ polyethylene sheet $1/16''$ thick and encased in an inner casing of anionic membrane, which served as the hygroscopic medium. This was then encased in a cationic membrane. Salinity did not appear to affect this meter, which showed a resistance of 440,000 ohms at 20% relative humidity and a resistance of 200,000 ohms at 50% relative humidity.

A fourth probe was made comprising both anionic and cationic resins in latex, used as both the ionic barrier and the moisture-sensitive element. A polyethylene core was wound with two wires about eight feet long each and was dipped in a suspension of about 30% cationic resin in Hycar 1852; then anionic resin was spread over the surface in a thick layer. Then, while the Hycar-cationic-resin mixture was still wet, it was dipped again in the mixture of Hycar and cationic resin. The device tested as follows:

| Relative humidity— | Electrical resistance, ohms |
|---|---|
| 20% | 20,000 |
| 50% | 3,500 |
| 98% | 2,200 |

Little difference was observed between its embodiment in an electrolytic solution and one which was free of electrolytes. There was no shorting out, and no discrepancies traceable to the composition of the solution.

The tests on concrete drying, which are soon to be discussed, were made using probes similar to the unit 30 shown in FIGS. 1 through 4. Polystyrene tubing ⅜" in diameter and 1½" long was threaded with bifilar turns for exactly one inch. Jewelers' palladium wire No. 38 AWG was used as described before, and the dilute (3.5%) solution of polyvinyl alcohol (du Pont Elvanol 20–105) was used as the coating agent. A rate of wind of twenty turns per inch for each wire was used. "Amberplex" ion selective membranes, made by Rohm and Haas, were used as the ion selective membranes, these embodying the invention described in Patents Nos. 2,681,319 and 2,681,320. As shown in FIGS. 1 through 4, both anionic and cationic membranes were used. They were sealed tight with a soldering iron. A plastic sealing compound was applied where the lead wires 32 and 33 came through the membranes.

Calibration technique available at the test showed that the units were capable of accuracy better than plus or minus .5% moisture, according to the dry weight of the specimen, but the calibration methods available were not as accurate as the meters so that the limit of accuracy is not known; the meters are believed to be very sensitive indeed.

It is well known that the amount of moisture present in hardened concrete has important effects upon all of its significant properties. If the concrete is not moist enough at early ages for hydration to be carried on efficiently and completely, the strength, durability, and elastic properties of the concrete are decreased. Shrinkage or expansion resulting from changes in moisture content may produce cracks or excessive beam and slab deflection or other undesirable effects. In hydraulic structures concrete may be in direct contact with aggressive water, which could cause swelling and disruptive pressures. Changes in moisture content may result in changes of from 3% to 6% of the weight of the structure, which may be important where gravity forces are to be considered. The success with which paint, linoleum, and other covering materials can be applied to concrete depends upon the extent to which the concrete tends to take up or to release moisture.

Three types of water association in concrete are recognized: (1) water is held by chemical bonds through hydration (chemically combined water); (2) water is held by physically developed surface forces (physically held water or solvation water); and (3) other water is free to leave the mass without affecting the cementing value of the paste and is beyond the influence of surface forces (capillary water). Physically-held and capillary water are the ones which cause shrinkage or swelling of the mass by a change in this water. This is the water which may freeze and by alternative freezing and thawing over many cycles may disintegrate a concrete mass.

Capillary and solvation water have one characteristic that enables them to be distinguished from the chemically combined water—they are readily removed by evaporation at a temperature slightly above 100° C. while no significant portion of the chemically combined water is so removed. Therefore, the water is classified as "evaporable" and "non-evaporable" water, the evaporable water being the one measured in the following tests and being defined as water lost during drying to constant weight at 105° C. Thus, a total moisture content may be determined by drying a sample to constant weight at 105° C. and comparing that weight with the weights before drying or weights during drying, or weights afterwards if water is added subsequently. A change from the evaporable to non-evaporable water due to further hydration does not effect any weight change.

Figure 18:
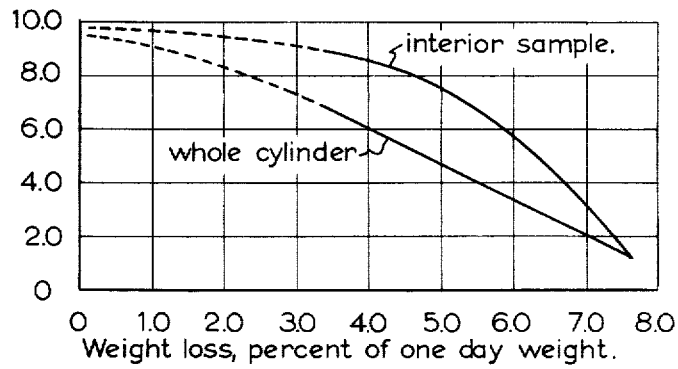
FIG. 18 is a graph plotting evaporable moisture content of mortar samples against weight loss of the samples, one a whole cylinder, the other an interior sample.

For the purposes of testing the effectiveness of these moisture meters, several units as described were placed in mortar specimens at the time of casting with the leads 32 and 33 projecting out therefrom. These mortar specimens were initially cured, different specimens for each test condition being stored at two different conditions of temperature and relative humidity. For each specimen measurements were made of weight loss and corresponding resistance of the moisture unit, at intervals of a few days throughout the total test period. For comparisons and determination of moisture content, mortar specimens were also cast without the moisture units and were stored at 100° F. and 20% relative humidity. At various ages these specimens were dried to constant weight at 105° C. and the weight loss, expressed as a percentage of the dry weight of the specimen, was termed the evaporable-moisture content. Determinations of these evaporable moisture contents were made both for whole cylinders and for interior cores removed by hammer and chisel. These cores were about a square inch in cross section and two inches long. FIG. 18 shows the evaporable moisture content of both types of samples plotted against weight loss during storage.

The mortar consisted of Portland cement and graded Ottawa sand in the proportions 1:2.75 by weight as specified in ASTM C 109–54T. The water-cement ratio was 0.50 by weight, providing a somewhat dry mix capable of placement through vibration to produce a mortar without large voids. The mixer employed was like that in ASTM C 305–55T and comprised blending the dry material for the first thirty seconds, adding water for the next thirty seconds while continuing to mix, and then mixing additionally for one more minute. The mortar was then placed into forms and vibrated by a vibrating table. The mortar was cured in the forms for one day at 70° F. and at 95% relative humidity. Then the forms were stripped from the samples, and the samples were cured one day at 70° F. and 100% relative humidity. Thereafter half of the samples of each group of specimens was stored at 70° F. and 50% relative humidity, while the remaining specimens were stored at 100° F. and 20% relative humidity.

Figure 19:
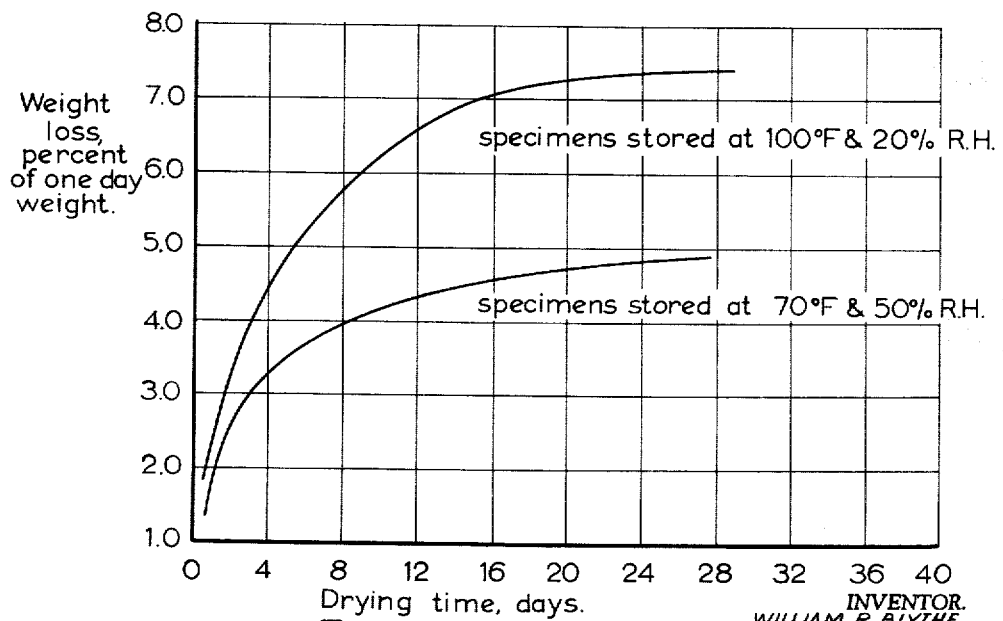
FIG. 19 is a graph plotting weight loss against drying time of specimens stored at two different conditions of temperature and relative humidity.

FIG. 19 shows curves plotting weight loss against drying time of specimens stored at these two conditions. Of course, the specimens stored at the higher temperature and lower relative humidity lost moisture much more quickly than did the other specimens. It may be noted that both curves are logarithmic, indicating a high rate of loss at early stages. A scatter obtained when compared with the drying weight method indicated an accuracy of the meters of better than plus or minus .5%.

Companion specimens were stored in a leaching tank to observe the effect caused by the leaching action of circulating distilled water. Such water withdraws the ionic salts present and enables evaluation of the effectiveness of the ion-selective membranes in preventing ionic action from affecting the measurements. The salinity of the leaching water was determined at intervals by appropriate measurements, and water was replaced whenever the concentration of salts tended to approach a constant value.

Figure 20:
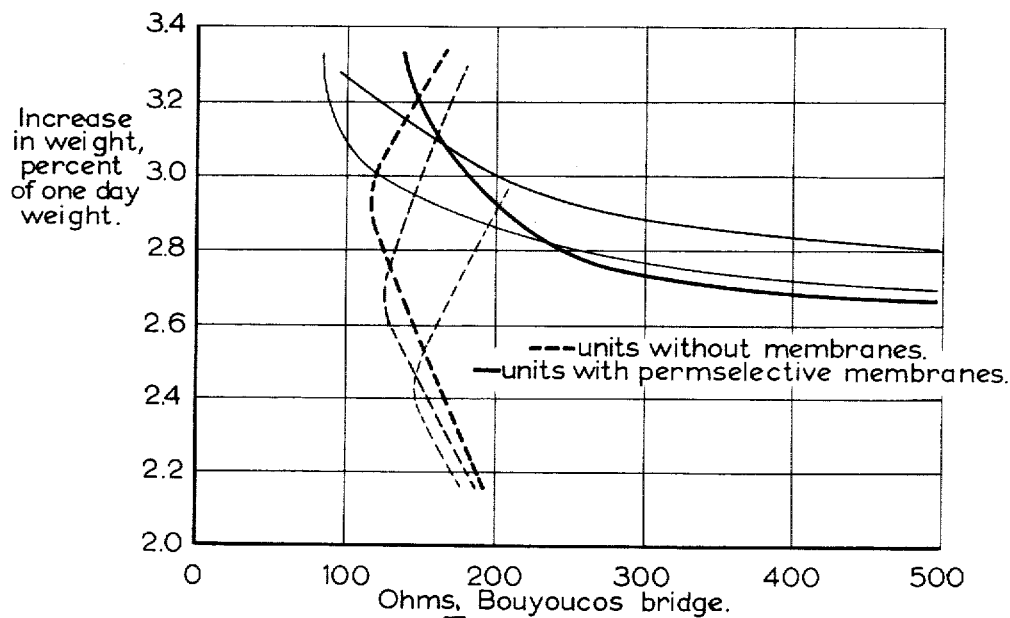
FIG. 20 is a graph plotting resistance against weight change in individual units subjected to leaching and comparing meters having permselective membranes with meters not having these membranes.

FIG. 20 shows that changes in salinity had no effect on the meters where the probe was enclosed in ion-selective membranes, while the effects on meters whose probes were not so protected were considerable. There was no difference in the results in the ion-barred meters from the leached specimens and those that were not leached, indicating that salinity had no effect, due to the use of the permselective membranes.

For a given water content expressed as percent of dry weight, the greater the density of the material, the more water there will be per unit volume, so that calibration in terms of water per unit volume may be better for many uses than of the percent of dry material. The meters of this invention are capable of such use and calibration. This indicates that when water content may be known, the density of the material may be determined so that the meters of this invention may be used as density meters.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A moisture meter probe whose response is substantially unchanged by the presence of ionizable material in an environment whose contained moisture is to be measured, comprising a pair of spaced-apart electrical conductors; a hygroscopic medium extending between the conductors; water-vapor-permeable ion-selective membrane covering said medium and conductors for isolating said medium and conductors from ions that affect the conductivity of moisture, and an electrical lead from each said conductor extending out from said ion-selective means and sealed therethrough.

2. A moisture-meter probe whose response remains substantially unchanged by ionizable material present in an environment whose contained moisture is to be measured, comprising a pair of spaced-apart electrical conductors; a hygroscopic medium of the type that comes to an equilibrium moisture content with respect to its surroundings, filling the space between the conductors; ion-selective membrane for passing water vapor to said medium while preventing passage of ions of said material covering said conductors and said medium; and electrical leads from each said conductor extending out from said ion-selective means and sealed thereto.

3. The probe of claim 2 wherein said ion selective means comprises a permselective membrane.

4. The probe of claim 2 wherein said ion selective means comprises a cation selective membrane and an anion selective membrane placed back to back.

5. The probe of claim 2 wherein said hygroscopic medium is polyvinyl alcohol.

6. The probe of claim 2 wherein said hygroscopic medium is a portion of said ion-selective means.

7. A moisture meter probe whose response is substantially unchanged by ionizable material present in an environment whose contained moisture is to be measured, comprising a pair of spaced-apart electrical conductors; a hygroscopic medium of the type that comes to an equilibrium moisture content with respect to its surroundings filling the space between the conductors; a casing means for passing water vapor and barring passage of liquid water salts in solution and of ions affecting the conductivity of water, covering said conductors and said medium; and electrical leads from each said conductor extending out from said casing and sealed therethrough.

8. A moisture-meter probe including in combination a dielectric core having bifilar helical grooves spaced apart at an even interval and at a constant pitch; a pair of palladium wires, one wound in each said groove; a hygroscopic film that comes to an equilibrium moisture content with respect to its surroundings, covering said wires and the space between said wires; a pair of ion-exchange resin membranes, one cationic and one anionic, completely encasing said wire, film, and core; and electrical leads sealed in said membranes and connected to said wires and extending outside said membranes.

9. A moisture meter probe including in combination a core having a plurality of groups of bifilar conductors on said core, each pair of conductors being spaced apart in its group, the groups being of different length; a hygroscopic film that comes to an equilibrium moisture content with respect to its surrounndings, covering said wires and the space between said wires; ion-exchange resin membranes completely encasing said wires, film, and core; and electrical leads sealed in said membranes and connected to said wires and extending outside said membranes.

10. A moisture-meter probe including in combination a dielectric sheet; printed bifilar conductors thereon spaced apart at an even interval and at a constant pitch; a hygroscopic film that comes to an equilibrium moisture content with respect to its surroundings, covering said conductors and the space between them; a pair of ion-exchange resin membranes, one cationic and one anionic, completely encasing said sheet, conductors, and coating; and electrical leads sealed in said membranes and connected to said conductors and extending outside said membranes.

11. A moisture-meter probe including in combination a dielectric cylindrical core having two groups of bifilar helical grooves spaced apart in each group at an even interval and at a constant pitch, one group being longer than the other; two pairs of palladium wires, one wound in each said groove; a hygroscopic film that comes to an equilibrium moisture content with respect to its surroundings, covering said wires and the space between said wires; ion-exchange resin membranes completely encasing said wires, film, and core; and electrical leads sealed in said membranes and connected to said wires and extending outside said membranes.

12. A moisture meter probe including in combination a dielectric core having bifilar helical grooves; a pair of noble metal wires, one wound in each said groove; a hygroscopic film that comes to an equilibrium moisture content with respect to its surroundings, covering said wires and the space between said wires; a pair of ion-exchange resin membranes, one cationic and one anionic, completely encasing said wire, film, and core; and electrical leads sealed in said membranes and connected to said wires and extending outside said membranes.

13. A moisture meter probe including in combination a dielectric sheet; bifilar conductors spaced apart thereon; a hygroscopic film that comes to an equilibrium moisture content with respect to its surroundings, covering said conductors and the space between them; a pair of ion-exchange resin membranes, one cationic and one anionic, completely encasing said sheet, conductors, and coating; and electrical leads sealed in said membranes and connected to said conductors and extending outside said membranes.

References Cited in the file of this patent

UNITED STATES PATENTS

| | | |
|---|---|---|
| 2,543,384 | Squier | Feb. 27, 1951 |
| 2,722,586 | Stearns et al. | Nov. 1, 1955 |
| 2,740,032 | Bouyoucos | Mar. 27, 1956 |
| 2,793,526 | Dalglish | May 28, 1957 |
| 2,937,524 | Gregor | May 24, 1960 |

OTHER REFERENCES

Treatise on Physical Chemistry, Taylor, vol. 1, 2nd edition, D. Van Nostrand Co. Inc., New York, 1931, relied on pages 406–414.

UNITED STATES PATENT OFFICE
CERTIFICATE OF CORRECTION

Patent No. 3,105,214                                September 24, 1963

William R. Blythe et al.

It is hereby certified that error appears in the above numbered patent requiring correction and that the said Letters Patent should read as corrected below.

Column 2, line 2, for "to produce" read -- do produce --; line 17, for "on" read -- in --; line 18, for "at" read -- as --; column 6, lines 1 and 2, for "anion-permeable" read -- anionic-permeable --; line 29, for "dried" read -- drier --; column 11, line 18, for "embodiment" read -- embeddment --.

Signed and sealed this 2nd day of June 1964.

(SEAL)
Attest:

ERNEST W. SWIDER                                            EDWARD J. BRENNER
Attesting Officer                                               Commissioner of Patents